US010266007B2

(12) United States Patent
Pessoa et al.

(10) Patent No.: US 10,266,007 B2
(45) Date of Patent: Apr. 23, 2019

(54) SYSTEM AND METHOD FOR ADJUSTING TORQUE DISTRIBUTION

(71) Applicant: General Electric Company, Schenectady, NY (US)

(72) Inventors: Leonardo Cezar de Faria Pessoa, Contagem (BR); Marc Flammia, Contagem (BR); Geraldo Alwin Griese, Contagem (BR); Cesar Domingos, Contagem (BR); Anu Kossery Jayaprakash, Bangalore (IN)

(73) Assignee: GE GLOBAL SOURCING LLC, Norwalk, CT (US)

( * ) Notice: Subject to any disclaimer, the term of this patent is extended or adjusted under 35 U.S.C. 154(b) by 392 days.

(21) Appl. No.: 15/265,848

(22) Filed: Sep. 15, 2016

(65) Prior Publication Data
US 2018/0072098 A1    Mar. 15, 2018

(51) Int. Cl.
| *B60B 39/02* | (2006.01) |
| *E01H 10/00* | (2006.01) |
| *E01H 8/10* | (2006.01) |
| *B60B 39/04* | (2006.01) |
| *B61C 15/10* | (2006.01) |
| *B60B 39/08* | (2006.01) |

(52) U.S. Cl.
CPC .......... *B60B 39/025* (2013.01); *B60B 39/021* (2013.01); *B60B 39/04* (2013.01); *B61C 15/10* (2013.01); *E01H 8/10* (2013.01); *E01H 10/007* (2013.01); *B60B 39/086* (2013.01); *B61C 15/102* (2013.01)

(58) Field of Classification Search
CPC ..... B60B 39/02; B60B 39/021; B60B 39/025; B60B 39/10; B61C 15/10; B61C 15/102; E01H 10/007
USPC ............................................................ 291/2
See application file for complete search history.

(56) References Cited

U.S. PATENT DOCUMENTS

| 5,350,035 | A | * | 9/1994 | Bodier | B60B 39/025 180/197 |
| 5,851,086 | A | * | 12/1998 | Kurasako | B60B 39/00 404/94 |
| 6,166,657 | A | * | 12/2000 | Mann | B60B 39/02 340/580 |
| 6,206,299 | B1 | * | 3/2001 | Mann | B60B 39/02 222/54 |
| 6,270,118 | B1 | * | 8/2001 | Ichikawa | B60B 39/024 280/757 |
| 6,535,141 | B1 | * | 3/2003 | Doherty | A01C 17/00 340/580 |
| 6,538,578 | B1 | * | 3/2003 | Doherty | A01C 17/00 340/580 |

(Continued)

*Primary Examiner* — Zachary L Kuhfuss
(74) *Attorney, Agent, or Firm* — Christopher R. Carroll; The Small Patent Law Group

(57) ABSTRACT

A system and method herein relate to vehicle control by adjusting a torque distribution of the vehicle. The system includes a first motor configured to provide a torque to a first wheel, and a delivery system configured to controllably apply a traction control compound to a route on which the first wheel is configured to travel. The system also includes a controller circuit having one or more processors. The controller circuit is configured to control the delivery system to apply the traction control compound to the route based on a monitored temperature of the first motor.

20 Claims, 6 Drawing Sheets

(56) References Cited

U.S. PATENT DOCUMENTS

| | | | | |
|---|---|---|---|---|
| 6,893,058 B2* | 5/2005 | Kumar | B61C 15/10 104/279 |
| 6,946,621 B1* | 9/2005 | Roseman | B60B 39/025 219/202 |
| 6,976,713 B2* | 12/2005 | Kish | B61C 15/107 222/72 |
| 6,977,597 B2* | 12/2005 | Doherty | A01C 17/00 340/580 |
| 7,027,900 B2* | 4/2006 | Kumar | B61C 15/14 180/197 |
| 7,290,807 B2* | 11/2007 | Kumar | B61C 15/10 291/2 |
| 7,594,682 B2* | 9/2009 | Kumar | B61C 15/10 104/279 |
| RE42,989 E* | 12/2011 | Eadie | B61K 3/02 291/3 |
| 9,056,525 B2* | 6/2015 | Piroozmandi | B60B 39/026 |
| 2002/0079707 A1* | 6/2002 | Skarie | B60B 39/025 291/38 |
| 2004/0262425 A1* | 12/2004 | Sakai | B05B 12/12 239/128 |
| 2005/0001479 A1* | 1/2005 | Watanabe | B60T 1/14 303/139 |
| 2006/0060441 A1* | 3/2006 | Sakai | B60B 39/02 191/2 |
| 2006/0131891 A1* | 6/2006 | Mandel | B60B 39/025 291/2 |
| 2008/0082244 A1* | 4/2008 | Watanabe | B60T 1/14 701/71 |
| 2013/0173094 A1* | 7/2013 | Cooper | B61C 15/107 701/19 |
| 2013/0320900 A1 | 12/2013 | Daigle | |
| 2014/0081515 A1* | 3/2014 | Goulet | B61C 15/107 701/36 |
| 2014/0277860 A1 | 9/2014 | Pulliam et al. | |
| 2018/0072098 A1* | 3/2018 | Pessoa | B60B 39/025 |

* cited by examiner

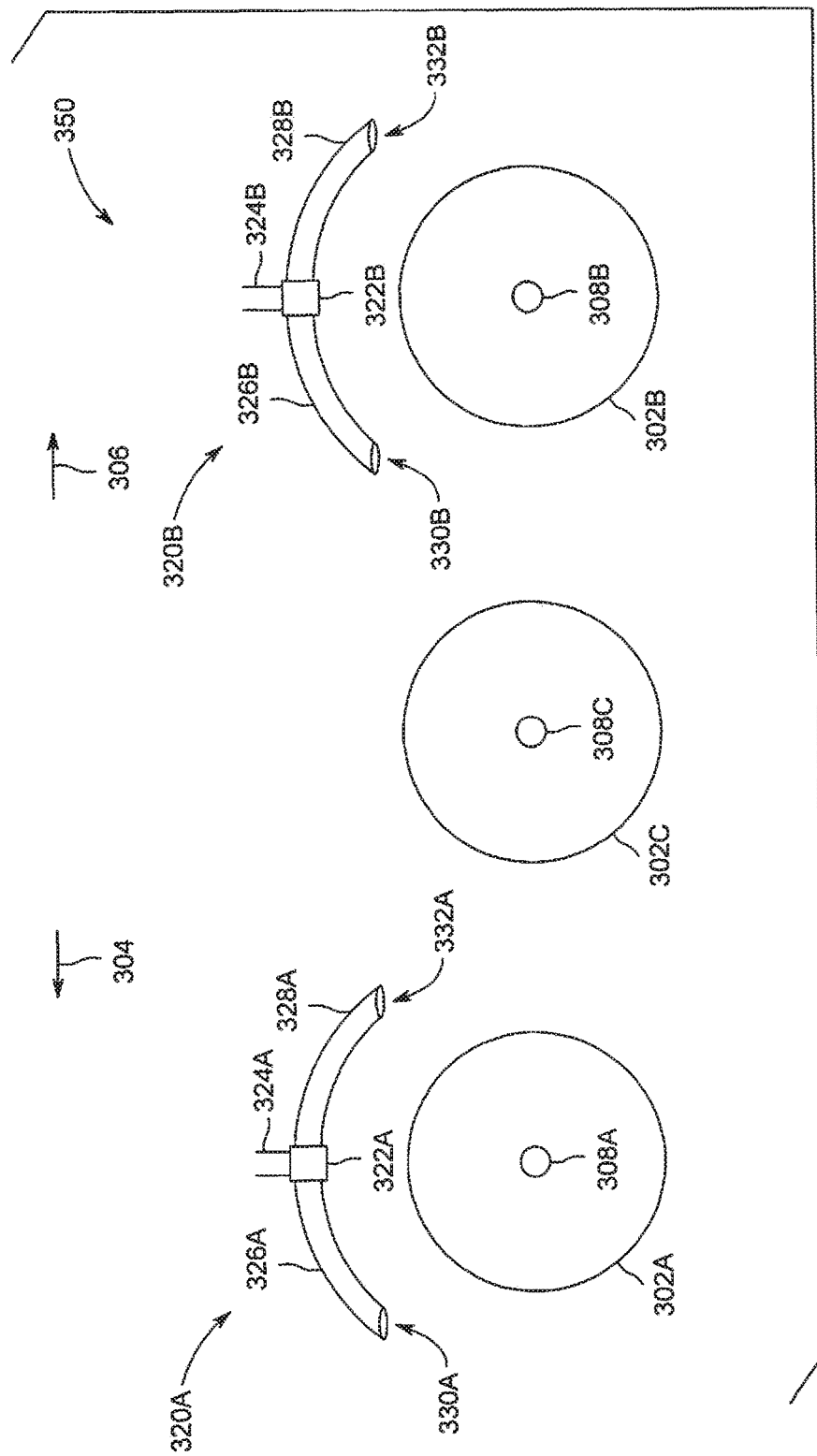

SYSTEM AND METHOD FOR ADJUSTING TORQUE DISTRIBUTION

FIELD

Embodiments of the subject matter disclosed herein relate to vehicle control.

BACKGROUND

A vehicle system may include one or more powered vehicles that may be mechanically or otherwise linked (directly or indirectly) to non-powered vehicles. For example, the vehicle system may include a train containing powered locomotives and non-powered cars. The powered and non-powered vehicles of the vehicle system may travel as a group according to a trip plan of a route within a transportation network. Each of the powered vehicles may have a plurality of axles utilized to produce a tractive effort to move the vehicle system along the route. However, during a start of the tractive effort and/or continuous tractive effort of the powered vehicle a weight transfer reaction can occur between the axles of the powered vehicle of the vehicle system. For example, a lead axle of the powered vehicle can carry a lower load with respect to a trailing axle of the powered vehicle. The weight transfer between the axles can result in a torque distribution variance (e.g., imbalance) between the axles of powered vehicles, with torque reductions at lead axles due to wheel to ground adhesion losses, and a simultaneous torque transfer to the heavier axles, which can require the rear and heavier axles operate above specified operational values (e.g., causing high temperature operations) while lead axles are underutilized. The same torque transfer can occur at sub-systems of a powered vehicle (e.g., between the powered axles of a bogie). Additionally, the torque variance can cause tractive effort deration due to temperature limits leading to a failure of the powered vehicle when continuous tractive effort is required.

BRIEF DESCRIPTION

In an embodiment, a system includes a reservoir configured to hold a traction control compound, and a delivery system coupled to the reservoir. The delivery system includes a first opening positioned proximate to a first wheel. The system includes a controller circuit having one or more processors. The controller circuit is configured to receive respective temperature measurements of a first motor and a second motor. The first motor is configured to provide a torque to the first wheel, and control transfer a portion of the traction control compound from the reservoir to the first opening when the temperature measurement of the first motor is above a predetermined non-zero threshold.

In an embodiment, a method includes monitoring a first temperature of a first motor and a second temperature of a second motor. The first motor is configured to provide a torque to a first wheel. The method includes transferring a portion of a traction control compound from a reservoir to a first opening when (e.g., responsive to) the first temperature is above a predetermined non-zero threshold to deposit the traction control compound on a portion of a route proximate to the first wheel.

In an embodiment, a system includes a first motor configured to provide a torque to a first wheel, and a delivery system configured to controllably apply a traction control compound to a route on which the first wheel is configured to travel. The system also includes a controller circuit having one or more processors. The controller circuit is configured to control the delivery system to apply the traction control compound to the route based on a monitored temperature of the first motor.

BRIEF DESCRIPTION OF THE DRAWINGS

The present inventive subject matter will be better understood from reading the following description of non-limiting embodiments, with reference to the attached drawings, wherein below:

FIGS. 3A-B are illustrations of an opening, in accordance with an embodiment;

DETAILED DESCRIPTION

Figure 1:
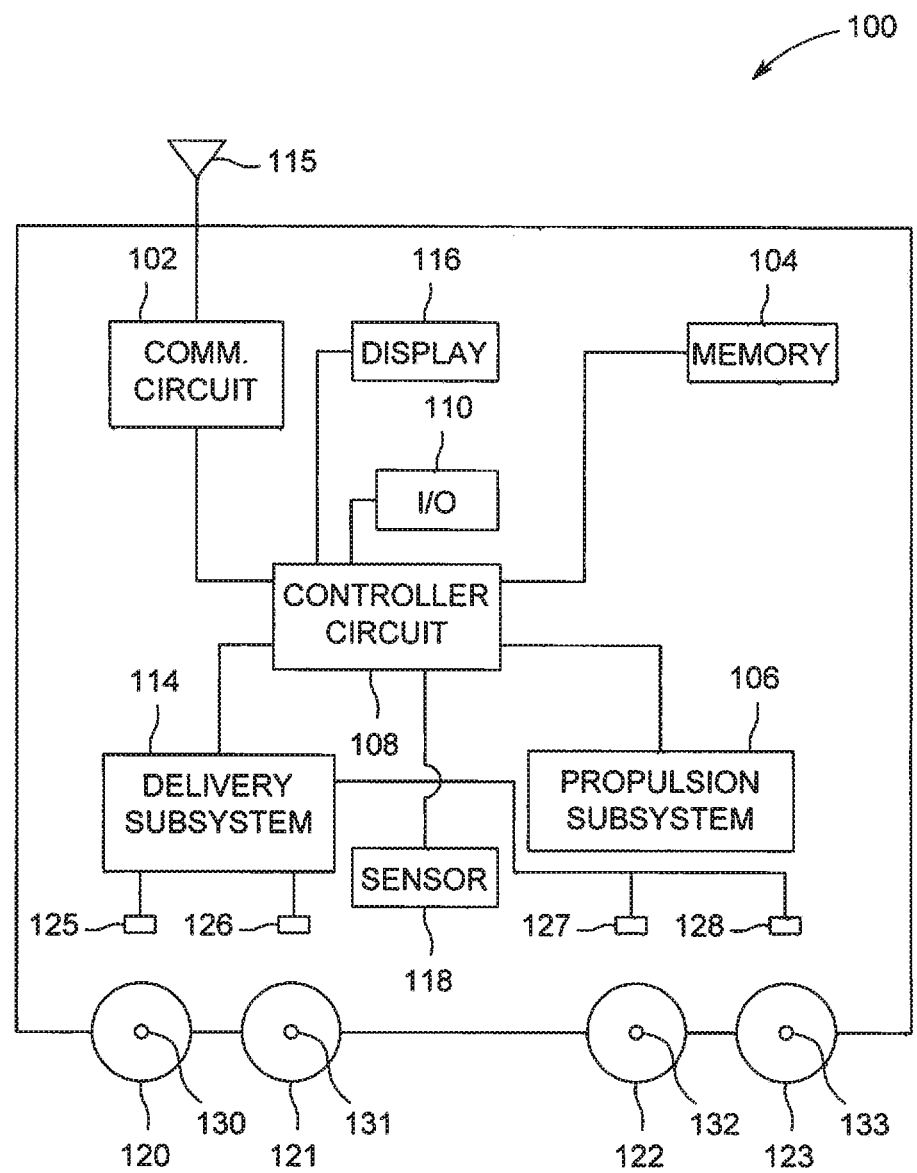
FIG. 1 is a schematic diagram of a powered vehicle system, in accordance with an embodiment.

One or more embodiments herein describe systems and methods for adjusting a torque distribution within a powered vehicle system. For example, a delivery subsystem of the vehicle system may deliver a traction control compound to one or more axles and/or wheels coupled to the axles. The traction control compound may be configured to increase an adhesion, friction, and/or the like between the wheels and a route traversed by the powered vehicle system. For example, the traction control compound may be sand, sandite, and/or the like. The traction control compound may be delivered by the delivery subsystem of the vehicle system based on temperature measurements of motors (e.g., traction motors) of the powered vehicle system. For example, the vehicle system may implement a temperature protection strategy based on temperature measurements representing temperatures of the motors of the vehicle system. The delivery subsystem may be configured to deliver the traction control compound to adjust power to limit a temperature of the motors. The temperature of the motor may be indicative of an amount of torque, traction and/or the like being applied to the axle. When a temperature of a certain motor is above a predetermined non zero threshold with at least one second motor below the predetermined non zero threshold, is indicative of differences between a torque of the motors resulting in a imbalanced torque distribution of the powered vehicle system, the torque of the second motor being reduced due to lack of wheel to route adhesion. The traction control compound may be delivered to the axles and/or wheels of the second motor not having a temperature above the threshold to increase the adhesion between the route and the wheels, and increase the torque delivered by the second motor to reduce the difference between axles and/or wheels of the powered vehicle system, therewith reducing the torque of the first motor, a torque relief that provides temperature reduction to the heavy loaded motor.

At least one technical effect of various embodiments described herein may include reduction of weight transfer effect of the vehicle system. At least one technical effect of various embodiments described herein may include improvement of the torque distribution between axles of the vehicle system. At least one technical effect of various embodiments described herein may include reduction of overload in trail axles of the powered vehicle sub-systems (e.g., axles of a bogie). At least one technical effect of various embodiments described herein may include elimination of temperature protection strategy application. At least one technical effect of various embodiments described herein may include improved usage distribution between motors of the vehicle system.

While the discussion and figures included herein may be interpreted as focusing on rail vehicle consists (e.g., trains) as the vehicle systems, it should be noted that not all embodiments of the subject matter herein described and claimed herein are limited to trains and railroad tracks. (A consist is a group of vehicles that are mechanically linked to travel together.) The subject matter of the systems and methods disclosed herein may apply to other vehicles, such as automobiles, trucks, and/or the like. Additionally, the vehicle system may not be mechanically linked but may be logically linked. For example, communicatively coupled with each other to coordinate travel along a route.

FIG. 1 is a schematic diagram of a vehicle system 100, in accordance with an embodiment. It should be noted that although the vehicle system 100 is shown as a single propulsion-generating vehicle (PGV), in other embodiments the vehicle system 100 may include more than one PGV and/or one or more non-propulsion generating vehicles mechanically coupled together to form a consist. The vehicle system 100 may include a communication circuit 102, a memory 104, a propulsion subsystem 106, a one or more sensors 118, an input/output (I/O) device 110, a display 116, a controller circuit 108, and a delivery system/subsystem 114. These components may communicate with each other via wired and/or wireless connections. Additionally or alternatively, the vehicle system 100 may include one or more components in addition to the listed components and/or one or more of the listed components may be included on a different vehicle that is communicatively coupled to the vehicle system 100.

The communication circuit 102 may include a transceiver, a transmitter and receiver, and/or the like. The communication circuit 102 may be electrically coupled to an antenna 115, for example, the communication circuit 102 is configured to wirelessly communicate, bi-directionally, with off-board locations, such as a remote system (e.g., central dispatch facility), other vehicle systems traveling within a transportation network, and/or the like.

The propulsion subsystem 106 is configured to provide tractive efforts to propel the vehicle system 100 along the route. The propulsion subsystem 106 may include one or more engines and/or motors, wheels, fins, or treads that engage the track material, and also a fuel or power source that energizes the engines and/or motors. For example, the propulsion subsystem 106 may include a plurality of traction motors that each generate a torque to corresponding axles 130-133 of the vehicle system 100. Optionally, each axle 130-133 is mechanically coupled to one of the traction motors. Additionally or alternatively, one of the traction motors may be coupled to a plurality of axles 130-133. Each wheel 120-123 of the vehicle system 100 is mechanically coupled to one of the axles 130-133, respectively, of the vehicle system 100. When the torque is applied to the axles 130-133 and thereby to the wheels 120-123, the wheels 120-123 rotate to propel the vehicle system 100.

The propulsion subsystem 106 may be associated with a braking subsystem (not shown) that is configured to slow movement of the vehicle system 100 and/or prohibit movement of the vehicle system 100 completely when actuated. It may be noted that although the vehicle system 100 is shown having four axles 130-133 in various embodiments the vehicle system 100 may have less than four axles 130-133 (e.g., two axles) or more than four axles 130-133 (e.g., six axles, eight axles).

The I/O device 110 is configured to receive input information from one or more user devices, such as a keyboard, a mouse, a hand-held device (e.g., cell phone, tablet, PDA, etc.), touchscreen, and/or a graphical user interface of the display 116. The I/O device 110 may transmit the input information to the controller circuit 108 for processing.

The display 116 may be an LCD (liquid crystal display), plasma display, CRT monitor, or the like. Optionally, the display 116 may include a touch sensitive surface (e.g., sensor or set of sensors that accepts input from a user based on haptic and/or tactile contact) which may be used as a part of the I/O device 110. For example, the display 116 may display a graphical user interface which is interfaced by the user by interacting with the touch sensitive surface of the display 116.

The controller circuit 108 controls the operation of the vehicle system 100. The controller circuit 108 may be embodied in hardware, such as a processor, controller, or other logic-based device, that performs functions or operations based on one or more sets of instructions (e.g., software). The instructions on which the hardware operates may be stored on a tangible and non-transitory (e.g., not a transient signal) computer readable storage medium, such as the memory 104. The memory 104 may include one or more computer hard drives, flash drives, RAM, ROM, EEPROM and/or the like. Alternatively, one or more of the sets of instructions that direct operations of the hardware may be hard-wired into the logic of the hardware.

The one or more sensors 118 are configured to monitor and/or acquire one or more characteristics of each of the traction motors of the propulsion subsystem 106. For example, the sensors 118 may generate sensor measurement signals representing temperatures of the traction motors, which is received and/or acquired the controller circuit 108 and/or the delivery subsystem 114. The sensor measurement signals include one or more electrical characteristics representing the temperature monitored and/or acquired by the sensors 118. Based on the one or more electrical characteristics of the sensor measurement signal (e.g., amplitude, voltage, current, frequency), the controller circuit 118 and/or the delivery subsystem 114 may determine the temperature of the traction motors of the propulsion subsystem 106. In one aspect, the sensors 118 may monitor the components of the propulsion subsystem 106 to protect the operation of the propulsion subsystem 106. For example, during operation of the traction motor, the temperature of the traction motor may indicate an amount of work, tractive effort, power and/or like demanded of the traction motor by the vehicle system 100. The temperature of the traction motors may indicate an imbalance in torque distribution between the traction motors.

The delivery subsystem 114 is configured to deliver the traction control compound to the axles 130-133 and/or wheels 120-123 of the vehicle system 100. The delivery subsystem 114 is operably coupled to openings 125-128 (e.g., apertures, holes, and/or the like) via a series of tubes and/or pipelines. For example, the delivery subsystem 114 is configured to deliver the traction control compound within the tubes and/or pipelines to one or more of the openings 125-128. Additionally or alternatively, the vehicle system 114 may have multiple delivery subsystems 114. For example, each of the axles 130-133 and/or the wheels 120-123 of the vehicle system 100 may have a corresponding delivery subsystem 114. In another example, two or more axles 130-133 and/or the wheels 120-123 of the vehicle system 100 may have a corresponding delivery subsystem 114.

Figure 2:
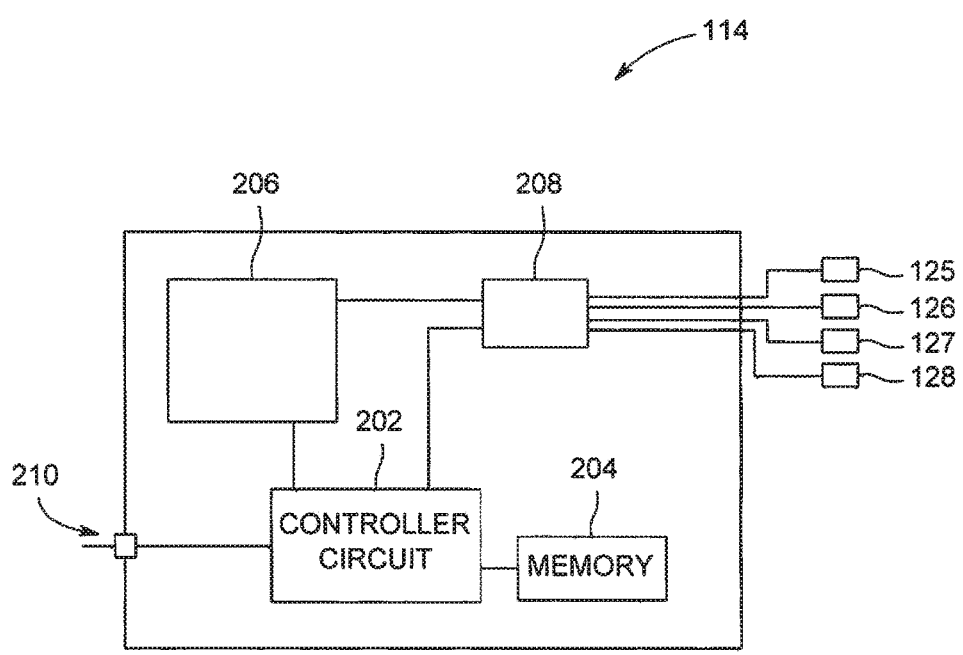
FIG. 2 is a schematic diagram of a delivery subsystem, in accordance with an embodiment.

In connection with FIG. 2, the delivery subsystem 114 may include a controller circuit 202, a reservoir 206, a memory 204, and a delivery circuit 208.

FIG. 2 is a schematic diagram of the delivery subsystem 114, in accordance with an embodiment. The reservoir 206 (e.g., tank, box) may be a volume configured to hold the traction control compound. The traction control compound may be sand, sandite, and/or the like configured to increase an adhesion, friction and/or the like between an outer surface area of the wheels 120-123 and the route traversed by the vehicle system 100.

Optionally, the reservoir 206 may include a sensor (not shown) configured to measure an amount of traction control compound within the reservoir 206. For example, the sensor of the reservoir 206 may measure a weight, a traction control compound, a level of the traction control compound and/or the like. The controller circuit 202 may receive and/or detect the amount of traction control compound within the reservoir 206 based on the sensor measurements. Additionally or alternatively, the controller circuit 202 may output and/or generate a fault when the amount of the traction control compound is below a threshold. For example, the controller circuit 202 may output a fault to the controller circuit 108 indicative that the amount of the traction control compound is below the threshold. Based on the fault, the controller circuit 108 may display a notification on the display 116 indicative that the amount of the traction control compound within the reservoir 206 is low and/or needs to be refilled. Optionally, based on the fault the controller circuit 202 may reduce an amount of traction control compound delivered to the openings 125-128 relative to an amount of traction control compound without the fault.

The controller circuit 202 controls the operation of the delivery subsystem 114. The controller circuit 202 may be embodied in hardware, such as a processor, controller, or other logic-based device, that performs functions or operations based on one or more sets of instructions (e.g., software). The instructions on which the hardware operates may be stored on a tangible and non-transitory (e.g., not a transient signal) computer readable storage medium, such as the memory 204. The memory 204 may include one or more computer hard drives, flash drives, RAM, ROM, EEPROM, or the like. Alternatively, one or more of the sets of instructions that direct operations of the hardware may be hard-wired into the logic of the hardware. Additionally or alternatively, the controller circuit 202 may receive instructions from the controller circuit 108. For example, the controller circuit 202 may be communicatively coupled to the controller circuit 108 via an I/O port 210.

The delivery circuit 208 is configured to direct the traction control compound from the reservoir 206 to a corresponding opening 125-128. For example, the delivery circuit 208 may mechanically couple the tubes and/or pipelines between the reservoir 206 and/or one or more of the openings 125-128. The delivery circuit 208 may receive instructions from the controller circuit 202 on which opening 125-128 to direct the traction control compound. Additionally or alternatively, the delivery circuit 208 may be a part of, integrated with, and/or the like with the controller circuit 202. For example, the operations of the delivery circuit 208 may be performed by the controller circuit 202.

Optionally, the delivery circuit 208 may include an air pressure system. For example, the delivery circuit 208 may generate compressed air to propel the traction control compound from the reservoir 206 to one or more of the openings 125-128. Additionally or alternatively, the traction control compound may be propelled by the delivery circuit 208 using gravity. For example, the reservoir 206 of the delivery subsystem 114 may be positioned above the openings 125-128 to allow a gravitational force of the earth may propel the traction control compound from the reservoir 206 to the one or more of the openings 125-128.

Figure 3A:
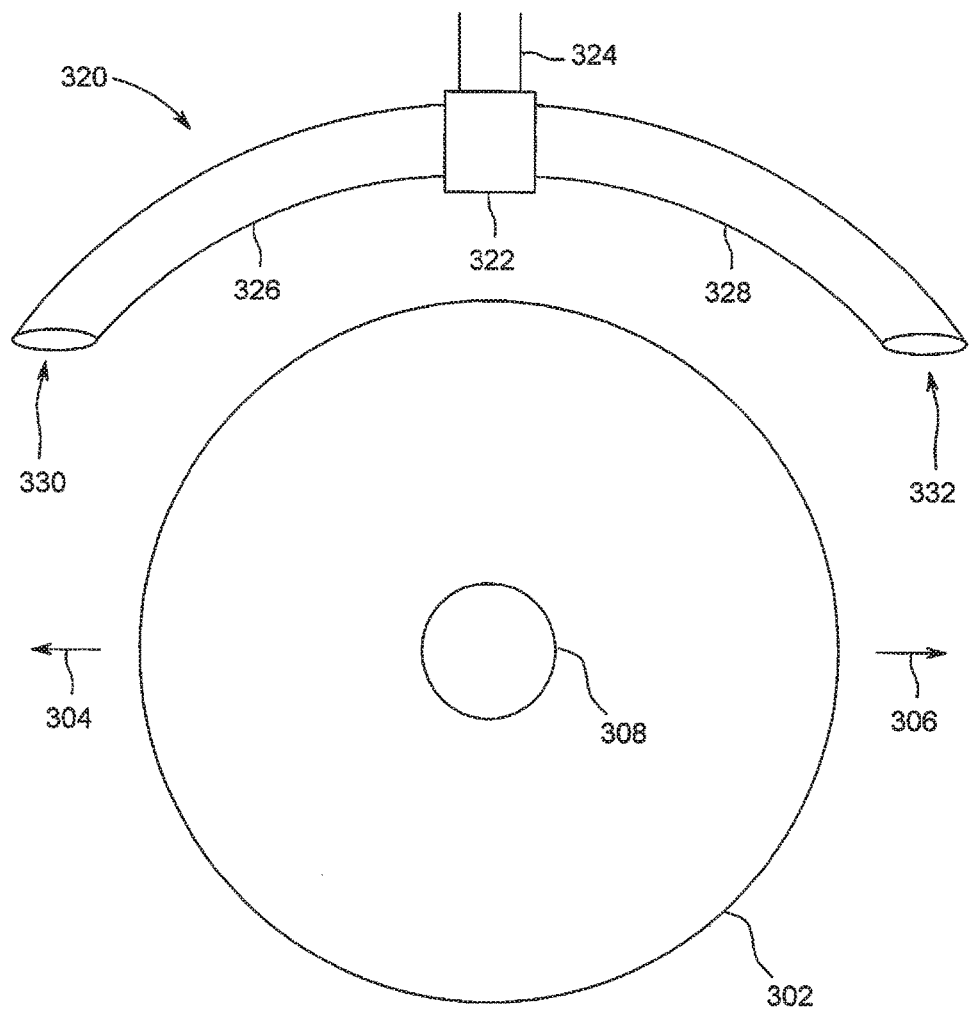

In connection with FIGS. 3A-B, the openings 125-128 shown in FIG. 1 may be proximate to the axles 130-133 and/or wheels 120-123 of the vehicle system 100.

FIGS. 3A-B are illustrations 300, 350 of openings 320, 320a-c, in accordance with an embodiment. For example, the openings 320, 320a-c may be similar to and/or the same as the openings 125-128 shown in FIG. 1. The opening 320 as shown in FIG. 3A is positioned above an axle 308 and/or wheel 302. In various embodiments, the opening 320 is configured to be positioned relative to the axle 308 and/or the wheel 302 to allow the traction control compound when exiting the opening 320 to be applied between an outer surface area of the wheels 120-123 and the route traversed by the vehicle system 100. The wheel 302 may be similar to and/or the same as the wheels 120-123. The opening 320 includes a tube and/or pipeline 324 coupled to the delivery subsystem (e.g., the delivery subsystem 114). For example, the opening 320 receives the traction control compound from the delivery subsystem via the tube and/or pipeline 324.

The opening 320 includes pipe arms 326 and 328 extending in opposing directions with respect to a junction switch 322. The pipe arms 326 and 328 include openings 330, 332 at a distal end of the pipe arms 326, 328 with respect to the pipeline 324. The openings 330, 332 are positioned at opposing ends of the wheel 302. The openings 330, 332 are configured such that the traction control compound is exhausted, deposited, and/or the like on the route prior to the wheel 302 making contact (e.g., when traveling and/or moving on the route) with the route overlaid with the traction control compound. Additionally or alternatively, the openings 330, 332 are configured such that the traction control compound is exhausted, deposited, and/or the like adjacent and/or proximate to the wheel 302.

The opening 320 may include a junction switch 322. The junction switch 322 is configured to direct the traction control compound from the pipeline 324 to one of the pipe arms 326, 328. For example, the junction switch 322 has a switch position, which directs the traction control compound to one of the pipe arms 326 and 328 based on the forward motion of the vehicle system. The switch position may be based on a forward motion, represented by one of the arrows 304, 306 of the vehicle system.

For example, the vehicle system has a forward motion aligned with the arrow 304. The junction switch 322 may direct the traction control compound to flow and/or traverse from the pipeline 324 through the pipe arm 326 having the opening 330 adjacent to the wheel 302 in a direction of the arrow 304. It may be noted that the junction switch 332 when directing the traction control compound to flow through the pipe arm 326 and may not direct the traction control compound through the pipe arm 328. In another example, the vehicle system has a forward motion aligned with the arrow 306. The junction switch 322 may direct the traction control compound to flow and/or traverse from the pipeline 324 through the pipe arm 328 having the opening 332 adjacent to the wheel 302 in a direction of the arrow 306. It may be noted that the junction switch 332 when directing the traction control compound to flow through the pipe arm 328 and may not direct the traction control compound through the pipe arm 326.

In connection with FIG. 3B, the openings 320a-b are configured such that the openings 330a-b and 332a-b may exhaust and/or deposit the traction control compound to different and/or adjacent wheels 302a-c and/or axles 308a-c based on a traveling direction (e.g., forward motion) of the vehicle system. For example, the opening 320a is positioned to deliver the traction control compound adjacent to the wheels 302a and 302c. In another example, the opening 320b is positioned to deliver the traction control compound adjacent to the wheels 302b and 302c. The delivery subsystem (e.g., the delivery subsystem 114) may be configured to utilize one or more of the openings 320a-b based on a direction the vehicle system traversing along the route.

For example, the vehicle system (e.g., the vehicle system 100) has a forward motion aligned with the arrow 304. The controller circuit (e.g., the controller circuit 108, 202) may instruct the delivery subsystem to deliver the traction control compound to the wheels 302a and 302c via the opening 320a. The junction switch 322a may direct the traction control compound to flow and/or traverse from the pipeline 324a through both of the pipe arms 326a and 328a to exhaust the traction control compound from the openings 330a and 332a. In another example, the vehicle system (e.g., the vehicle system 100) has a forward motion aligned with the arrow 306. The controller circuit (e.g., the controller circuit 108, 202) may instruct the delivery subsystem to deliver the traction control compound to the wheels 302a and 302c via the openings 320a and 320b. The junction switch 322a of the opening 320a may direct the traction control compound to flow and/or traverse from the pipeline 324a through the pipe arm 328a having the opening 332a to deposit the traction control compound adjacent to the wheel 302a. The junction switch 322b of the opening 320b may direct the traction control compound to flow and/or traverse from the pipeline 324b through the pipe arm 326b having the opening 330b to deposit the traction control compound adjacent to the wheel 302c.

Figure 4:
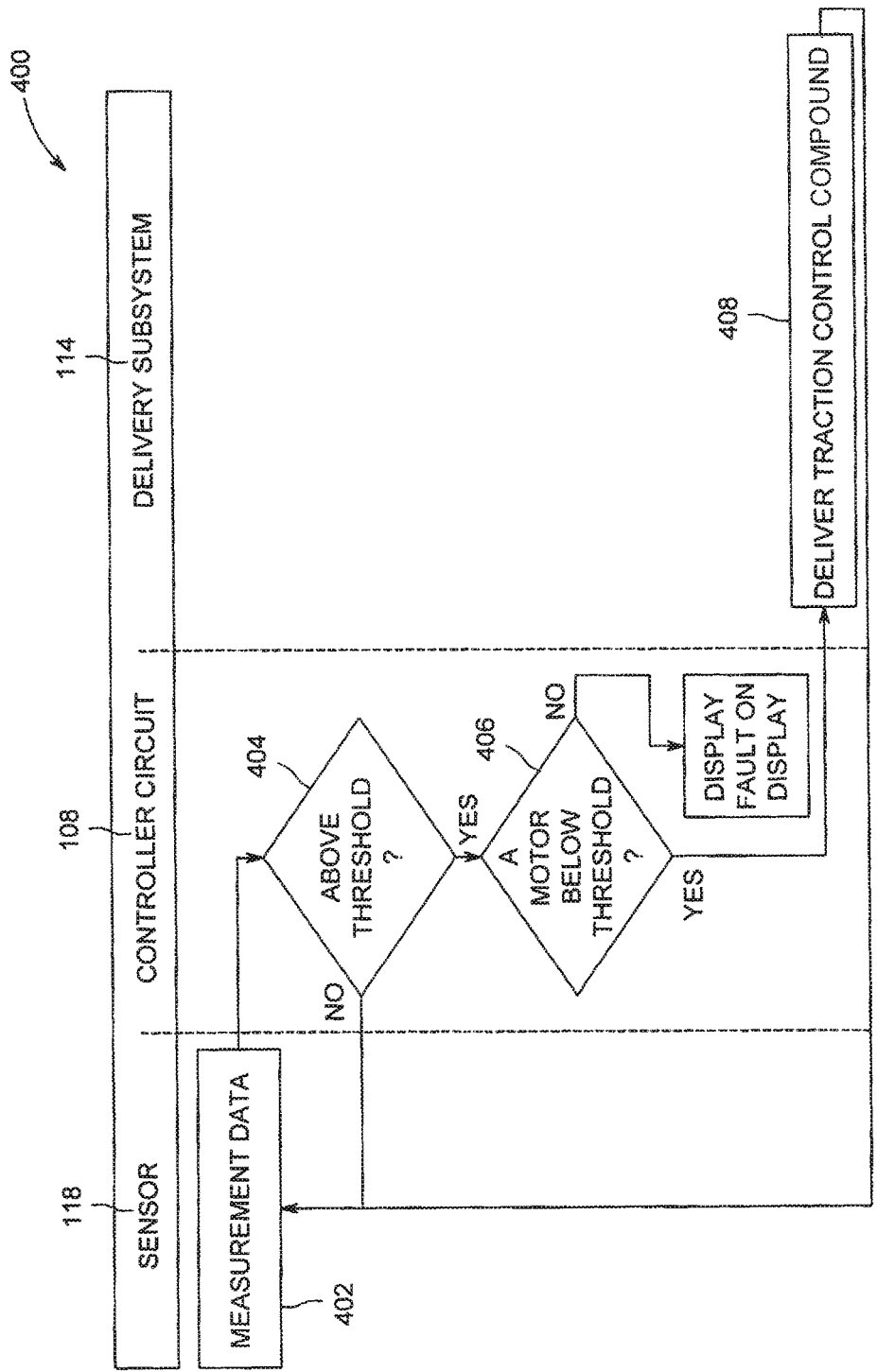
FIG. 4 is a swim diagram of a method for adjusting a torque distribution of a vehicle system, in accordance with an embodiment.

FIG. 4 is a swim lane diagram 400 of a method for adjusting a torque distribution of the vehicle system 100, in accordance with an embodiment. The method, for example, may employ or be performed by structures or aspects of various embodiments (e.g., systems and/or methods) discussed herein. For example, the swim lane diagram 400 includes operations performed by the plurality of sensors 118, controller circuit 108, and the delivery subsystem 114. In various embodiments, certain operations may be omitted or added, certain operations may be combined, certain operations may be performed simultaneously, certain operations may be performed concurrently, certain operations may be split into multiple operations, certain operations may be performed in a different order, or certain operations or series of operations may be re-performed in an iterative fashion. In various embodiments, portions, aspects, and/or variations of the method may be able to be used as one or more algorithms to direct hardware to perform one or more operations described herein.

It may be noted in various embodiments the operations of the controller circuit 108 shown in the swim lane diagram 300 may be performed by the controller circuit 202 of the delivery subsystem 114. Additionally or alternatively, the operations of the delivery subsystem 114 may be integrated with and/or performed by the controller circuit 108.

Beginning at 402, the one or more sensors 118 generate measurement data of the traction motors of the propulsion subsystem 106. For example, the sensors 118 may generate sensor measurement signals representing a temperature of the traction motors of the vehicle system 100 that generate torques to corresponding axles 130-133 of the vehicle system 100. The sensor measurement signals include one or more electrical characteristics representing the temperature monitored and/or acquired by the sensors 118. The sensor measurement signals may correspond to an analog signal having an amplitude, voltage, current, and/or the like that correspond to the temperatures of the traction motors. Additionally or alternatively, the sensor measurement signals may be a digital signal having a frequency, binary sequence, and/or the like that correspond to the temperatures of the traction motors.

At 404, the controller circuit 108 determines if the temperature of the traction motors is above a predetermined non-zero threshold. During operation of the traction motor, the temperature of the traction motor may indicate an amount of work, tractive effort, power and/or like demanded of the traction motor to generate a torque utilized to propel the vehicle system 100. Optionally, the controller circuit 108 may monitor the temperature data of the traction motors over time by acquiring the sensor measurement signals and/or calculating the temperature of the traction motors based on the one or more electrical characteristics of the sensor measurements signals. For example, the sensor measurement signals may be a digital signal representing a value. The controller circuit 108 may compare the value of the temperature with the predetermine non-zero threshold. Additionally or alternatively, in connection with FIG. 5, the controller circuit 108 may compare the sensor measurement signals generated by the sensors 118 to a predetermined non-zero threshold 504.

Figure 5:
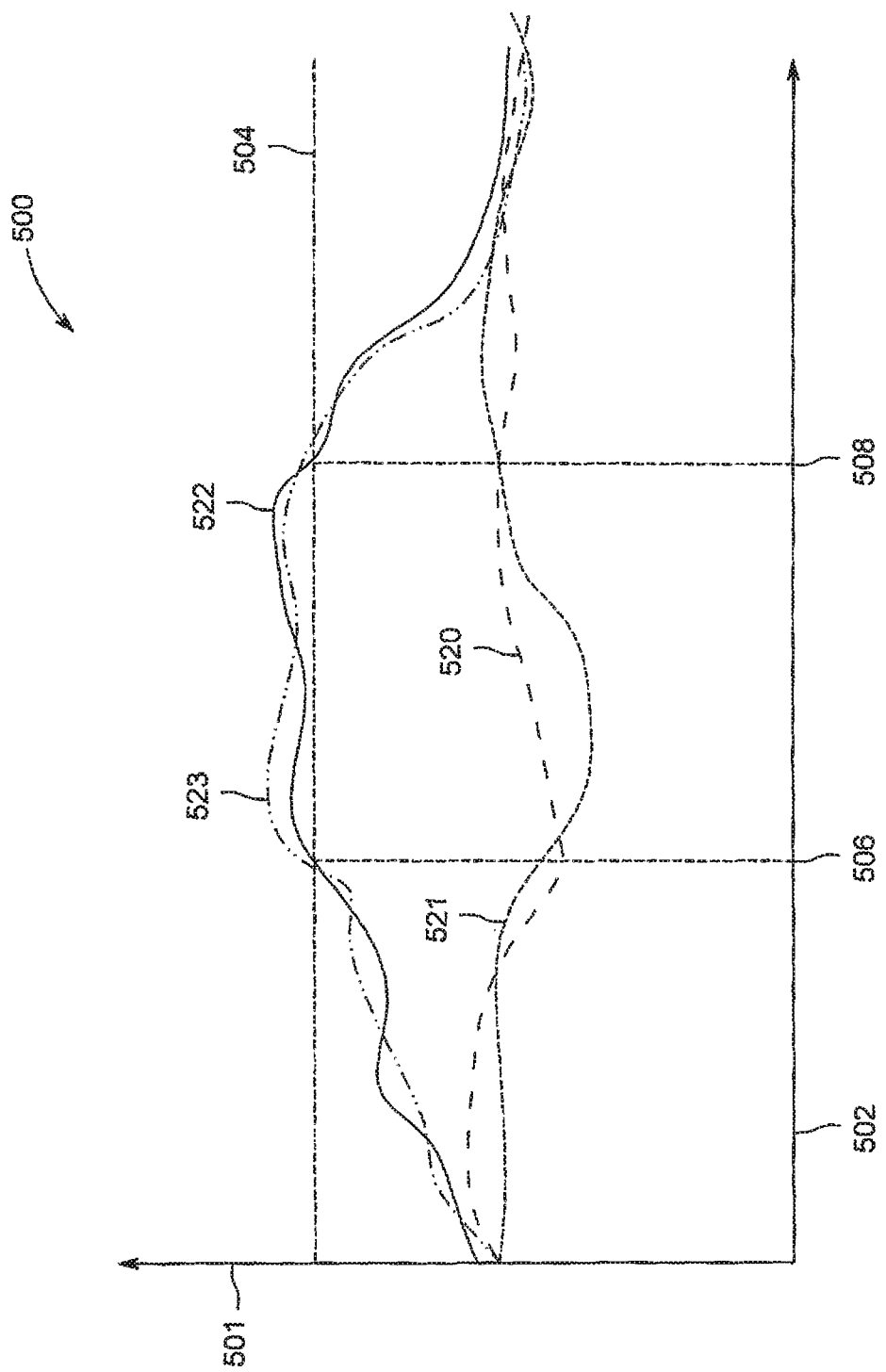
FIG. 5 is a graphical representation of sensor measurement signals, in accordance with an embodiment.

FIG. 5 is a graphical representation 500 of sensor measurement signals 520-523, in accordance with an embodiment. The sensor measurement signals 520-523 may correspond to traction motors of the vehicle system 100. For example, the sensor measurement signals 520-523 may correspond to temperatures of the traction motors of the propulsion subsystem 106 for the axles 130-133, respectively. The differences in temperatures between the traction motors may be caused by load imbalances between slipping traction motors and non-slipping traction motors. For example, the load imbalances may be caused by wheel slips due to adhesion loss between one or more of the wheels 120-123 of the slipping traction motors that suffer from weight reductions when the load is transferred to alternative wheels 120-123 of the non-slipping traction motors. The sensor measurement signals 520-523 are plotted over a horizontal axis 502 representing time. The sensor measurement signals 520-523 having an amplitude corresponding to a temperature value based on a position along a vertical axis 501. The controller circuit 108 may compare the sensor measurement signals 520-523 to the predetermined non-zero threshold 504. The predetermined non-zero threshold 504 may be stored in the memory 104, 204. The threshold 504 may be based on a designed operation specification (e.g., mechanical, electrical, thermal, and/or the like) by a manufacturer of the traction motor, which indicates conditions on when the traction motor may fail. For example, when the traction motor operates above the designed operation specification for a period of time, an increased likelihood of mechanical and/or electrical failure, damage, protective performance reductions, and/or the like of the traction motor may occur. It may be noted in various embodiments the predetermined non-zero threshold 504 may correspond to an engineering parameter configured to prevent operation of the traction motor outside the designed operation specification.

For example, the designed operation specification may define a temperature of a traction motor during operation, for example only, should not exceed 150 degrees Celsius. The predetermined non-zero threshold 504 may be at and/or a set value (e.g., percentage, a set value, and/or the like) from the designed operation specification. For example, the predetermined non-zero threshold 504 may be set at 90% of the value of the designed operation specification. It may be noted that although the threshold 504 is shown as an amplitude value in other embodiments the threshold 504 may be a frequency, a slope, a binary value, and/or the like.

The controller circuit 108 may determine that the temperature of the traction motors is above the threshold 504 when an amplitude of at least one of the sensor measurement signals 520-523 is above the threshold 504. For example, the controller circuit 108 may determine at 506 the sensor measurement signals 522 and 523 correspond to temperatures of the traction motors of the axles 132-133 having the wheels 122 and 123 is above the threshold 504.

If one of the traction motors has a temperature above the predetermined non-zero threshold, then at 406 the controller circuit 108 may determine if at least one of the motors (e.g., traction motors) is below the predetermined non-zero threshold 504. Differences in temperatures of the traction motors may be indicative of different power, tractive effort and/or the like between the traction motors, which correspond to a counterbalance in the torque distribution of the vehicle system 100 between the traction motors. For example, when a first temperature of a first traction motor is above the threshold and a second temperature of a second traction motor is below the threshold can be indicative that the first and second traction motors are generating different amounts of torque to corresponding axles 130-133. The different amount of torques are indicative of an imbalance (e.g., the torque generated by the traction motors are the same and/or within a threshold) in the torque distribution of the vehicle system 100. For example, the imbalance can be associated to wheel slips of one or more wheels 120-123 connected to corresponding traction motors having a relatively less load compared to alternative traction motors of the vehicle system 100.

The controller circuit 108 may determine that the temperature of at least one of the traction motors is below the threshold 504 when an amplitude of at least one of the sensor measurement signals 520-523 is below the threshold 504. For example, the controller circuit 108 may determine the sensor measurement signals 520 and 521 correspond to temperatures of the traction motors of the axles 130-131 having the wheels 120 and 121 is below the threshold 504.

If there is no traction motor below the threshold 504, then at 407 the controller circuit 108 may instruct the display 116 to display a fault notification, equipment usage abuse notification, and/or the like. For example, the controller circuit 108 may display a graphical icon configured to notify (e.g., textually, graphically, using one or more colors, and/or the like) the user that the traction motors of the vehicle system 100 is at fault and/or not operating within the designed operation specification of the traction motors. Optionally, the communication circuit 102 may automatically transmit the fault to a remote system (e.g., dispatch facility) to schedule maintenance and/or other corrective actions for the vehicle system 100.

At 408, the delivery subsystem 114 may deliver the traction control compound to the select axles 130-131. For example, the controller circuit 108 may instruct the controller circuit 202 of the delivery subsystem 114 to deliver the traction control compound to the axles (e.g., axles 130, 132) and/or wheels (e.g., the wheels 120, 121) of the traction motors identified at 406 having temperatures below the threshold 504. Additionally or alternatively, the controller circuit 108 may include a forward motion of the vehicle system 100, which may be utilized to direct the openings 125-128 to deposit the traction control compound to a forward position relative to the wheels 120, 121.

Based on the received instructions, the controller circuit 202 may instruct the delivery circuit 208 to deliver the traction control compound to the openings 125 and 126. The delivery circuit 208 may transfer the traction control compound from the reservoir 206 to the openings 125 and 126 via the tubes and/or pipelines (e.g., the pipeline 324 in FIG. 3) connecting the openings 125 and 126 to the delivery circuit 208. In various embodiments, the delivery circuit 208 may transfer the traction control compound from the reservoir 206 to the openings 125, 126 at a rate within a set predetermined threshold, for example, to remain relatively constant. For example, the delivery circuit 208 may continually deliver the traction control compound to the openings 125 and 126.

The openings 125 and 126 deposit the traction control compound adjacent to the wheels 120 and 121 onto the route traversed by the vehicle system 100. For example, the openings 125 and 126 are configured to overlay the traction control compound on the route, which will be traveled on by the wheels 120 and 121. When the wheels 120 and 121 move along the route with the traction control compound, the adhesion, friction, and/or the like of the wheels 120 and 121 in contact with the route is increased relative to the route not having the traction control compound. Based on the changes in the adhesion of the wheels 120 and 121 with the route, the torque distribution between the traction motors of the vehicle system 100 is adjusted. For example, as the traction compound is applied proximate and/or adjacent to the wheels 120 and 121 (e.g., the slipping wheels) the traction force is increased and the torque and/or load of the corresponding traction motors of the wheels 120 and 121 is increased. The increased force contribution of the traction motors of the wheels 120 and 121 decreases the load of at the traction motors operating above the predetermined threshold 504 corresponding to the wheels 122 and 123 adjusting the torque distribution of the vehicle system 100 and consequently reducing the temperature of the traction motors of the wheels 122 and 123.

For example, in connection with FIG. 5, the delivery circuit 208 may be instructed by the controller circuit 108 to deliver the traction control compound at time 506. The delivery circuit 208 may continually deliver the traction control compound from 506 to 508. At time 508, the sensor measurement signals 522 and 523 are below the threshold 504. The controller circuit 108 may determine (e.g., at 404) that the temperature of the traction motors are below the threshold 504 at 508 of the sensor measurement signals 522 and 523. The torque of the traction motors corresponding to the wheel 120 and 121 may have increased due to the deposit of the traction control compound on the route. The leveling of the torque distribution between the traction motors corresponding to the wheels 120-123 reduces the amount of work, power and/or the like demanded by the traction motors of the wheels 122 and 123 associated to the sensor measurement signals 522 and 523, thereby reducing the temperature of the traction motors. Based on the determination of the controller circuit 108, the controller circuit 108 may instruct the delivery circuit 208 to stop delivering the traction control compound to the openings 125 and 126.

Additionally or alternatively, when delivering the traction control compound to the openings 125-128, the controller circuit 108 may instruct the delivery circuit 208 on an amount and/or rate of the traction control compound transferred from the reservoir 206 and delivered to the openings 125-128. For example, the controller circuit 108 may define an amount and/or rate of the traction control compound delivered by the delivery circuit 208 based on an amount of time the temperature of the traction motor is above the threshold 504. In various embodiments, the amount of the traction control compound may increase over time as the duration of the temperature of the traction motor is above the threshold 504 increases. In another example, the controller circuit 108 may define the amount and/or rate of the traction control compound delivered by the delivery circuit 208 based on an amount of the traction control compound within the reservoir 206. In another example, the controller circuit 108 may define the amount and/or rate of the traction control compound delivered by the delivery circuit 208 based on a number of traction motors below the threshold 504 determined at 406.

In an embodiment, a system is provided. The system includes a reservoir configured to hold a traction control compound, and a delivery system coupled to the reservoir. The delivery system includes a first opening positioned proximate to a first wheel. The system includes a controller circuit having one or more processors. The controller circuit is configured to receive respective temperature measurements of a first motor and a second motor. The first motor is configured to provide a torque to the first wheel, and control transfer a portion of the traction control compound from the reservoir to the first opening when the temperature measurement of the first motor is above a predetermined non-zero threshold.

Optionally, the controller circuit is configured to control transfer the portion of the traction control compound from the reservoir to the opening when the temperature measurement of the first motor is above the predetermined non-zero threshold and the temperature measurement of the second motor is below the predetermined non-zero threshold.

Optionally, the predetermined non-zero threshold is based on a designed operation specification of the first and second motors.

Optionally, the delivery system includes a junction switch configured to direct the traction control compound to a first pipe arm or a second pipe arm of the delivery system based on a forward motion of a vehicle system. Additionally or alternatively, the first and second pipe arms extend in opposing directions.

Optionally, the traction control compound is sand or sandite.

Optionally, the traction control compound is configured to increase an adhesion between an outer surface area of the first wheel and a route.

Optionally, the system includes a sensor configured to measure an amount of traction control compound within the reservoir. The controller circuit is configured to generate a fault when the traction control compound is below a threshold and reduce an amount of traction control compound transferred to the opening based on the fault.

Optionally, the controller circuit is further configured to adjust an amount of the traction control compound transferred to the opening based on a duration of the temperature of the first motor above the predetermined non-zero threshold or an amount of the traction control compound within the reservoir.

In an embodiment a method is provided. The method includes monitoring a first temperature of a first motor and a second temperature of a second motor. The first motor is configured to provide a torque to a first wheel. The method includes transferring a portion of a traction control compound from a reservoir to a first opening when the first temperature is above a predetermined non-zero threshold to deposit the traction control compound on a portion of a route proximate to the first wheel.

Optionally, the method includes adjusting a junction switch associated with the first opening based on a forward motion of a vehicle system. A position of the junction switch controls amounts of the traction control compound sent to a first pipe arm that defines the first opening and sent to a second pipe arm.

Optionally, the predetermined non-zero threshold is based on a designed operation specification of the first and second motors.

Optionally, the traction control compound is sand or sandite.

Optionally, the traction control compound is configured to increase an adhesion between an outer surface area of the first wheel and a route.

Optionally, the method includes adjusting an amount of the traction control compound transferred to the opening based on a duration of the first temperature of the first traction motor above the predetermined non-zero threshold.

Optionally, the method includes adjusting an amount of the traction control compound transferred to the opening base on an amount of the traction control compound within the reservoir.

In an embodiment, a system is provided. The system includes a first motor configured to provide a torque to a first wheel, and a delivery system configured to controllably apply a traction control compound to a route on which the first wheel is configured to travel. The system also includes a controller circuit having one or more processors. The controller circuit is configured to control the delivery system to apply the traction control compound to the route based on a monitored temperature of the first motor.

Optionally, the system includes a second motor, and one or more sensors configured to generate temperature measurements of the first motor and second motor. The delivery system includes a reservoir configured to hold the traction control compound and a first opening coupled to the reservoir. The first opening includes an opening proximate to the first wheel for application of the traction control compound to the route. The controller is configured to monitor temperature data of the first motor and the second motor based on the temperature measurements, and transfer a portion of the traction control compound from the reservoir to the opening when the temperature data of the first motor is above a predetermined non-zero threshold. Additionally or alternatively, the delivery system includes a junction switch configured to direct the traction control compound to a first pipe arm or a second pipe arm based on a forward motion of a vehicle system.

Optionally, the traction control compound is sand or sandite.

As used herein, the terms "module", "system," "circuit," "device," or "unit," may include a hardware and/or software system and circuitry that operates to perform one or more functions. For example, a module, circuit, unit, device, or system may include a computer processor, controller, or other logic-based device that performs operations based on instructions stored on a tangible and non-transitory computer readable storage medium, such as a computer memory. Alternatively, a module, unit, device, circuit, or system may include a hard-wired device that performs operations based on hard-wired logic and circuitry of the device. The modules, units, circuit, or systems shown in the attached figures may represent the hardware and circuitry that operates based on software or hardwired instructions, the software that directs hardware to perform the operations, or a combination thereof. The modules, systems, circuit, devices, or units can include or represent hardware circuits or circuitry that include and/or are connected with one or more processors, such as one or computer microprocessors.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, or the like). Similarly, the programs may be stand alone programs, may be incorporated as subroutines in an operating system, may be functions in an installed software package, or the like. The various embodiments are not limited to the arrangements and instrumentality shown in the drawings.

As used herein, an element or step recited in the singular and proceeded with the word "a" or "an" should be understood as not excluding plural of said elements or operations, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A system comprising:
   a reservoir configured to hold a traction control compound;
   a delivery system coupled to the reservoir, wherein the delivery system includes a first opening positioned proximate to a first wheel;
   a controller circuit having one or more processors, wherein the controller circuit is configured to:
   receive respective temperature measurements of a first motor and a second motor, wherein the first motor is configured to provide a torque to the first wheel; and
   control transfer a portion of the traction control compound from the reservoir to the first opening when the temperature measurement of the first motor is above a predetermined non-zero threshold.

2. The system of claim 1, wherein the controller circuit is configured to control transfer the portion of the traction control compound from the reservoir to the opening when the temperature measurement of the first motor is above the predetermined non-zero threshold and the temperature measurement of the second motor is below the predetermined non-zero threshold.

3. The system of claim 1, wherein the predetermined non-zero threshold is based on a designed operation specification of the first and second motors.

4. The system of claim 1, wherein the delivery system includes a junction switch configured to direct the traction control compound to a first pipe arm or a second pipe arm of the delivery system based on a forward motion of a vehicle system.

5. The system of claim 4, wherein the first and second pipe arms extend in opposing directions.

6. The system of claim 1, wherein the traction control compound is sand or sandite.

7. The system of claim 1, wherein the traction control compound is configured to increase an adhesion between an outer surface area of the first wheel and a route.

8. The system of claim 1, further comprising a sensor configured to measure an amount of traction control compound within the reservoir, wherein the controller circuit is configured to generate a fault when the traction control compound is below a threshold and reduce an amount of traction control compound transferred to the opening based on the fault.

9. The system of claim 1, wherein the controller circuit is further configured to adjust an amount of the traction control compound transferred to the opening based on a duration of the temperature of the first motor above the predetermined non-zero threshold or an amount of the traction control compound within the reservoir.

10. A method comprising:
monitoring a first temperature of a first motor and a second temperature of a second motor, wherein the first motor is configured to provide a torque to a first wheel; and
transferring a portion of a traction control compound from a reservoir to a first opening when the first temperature is above a predetermined non-zero threshold to deposit the traction control compound on a portion of a route proximate to the first wheel.

11. The method of claim 10 further comprising adjusting a junction switch associated with the first opening based on a forward motion of a vehicle system, wherein a position of the junction switch controls amounts of the traction control compound sent to a first pipe arm that defines the first opening and sent to a second pipe arm.

12. The method of claim 10, wherein the predetermined non-zero threshold is based on a designed operation specification of the first and second motors.

13. The method of claim 10, wherein the traction control compound is sand or sandite.

14. The method of claim 10, wherein the traction control compound is configured to increase an adhesion between an outer surface area of the first wheel and a route.

15. The method of claim 10, further comprising adjusting an amount of the traction control compound transferred to the opening based on a duration of the first temperature of the first traction motor above the predetermined non-zero threshold.

16. The method of claim 10, further comprising adjusting an amount of the traction control compound transferred to the opening base on an amount of the traction control compound within the reservoir.

17. A system comprising:
a first motor configured to provide a torque to a first wheel;
a delivery system configured to controllably apply a traction control compound to a route on which the first wheel is configured to travel; and
a controller circuit having one or more processors, wherein the controller circuit is configured to control the delivery system to apply the traction control compound to the route based on a monitored temperature of the first motor.

18. The system of claim 17, further comprising:
a second motor; and
one or more sensors configured to generate temperature measurements of the first motor and second motor;
wherein the delivery system includes a reservoir configured to hold the traction control compound and a first opening coupled to the reservoir, wherein the first opening includes an opening proximate to the first wheel for application of the traction control compound to the route; and
wherein the controller is configured to: monitor temperature data of the first motor and the second motor based on the temperature measurements; and transfer a portion of the traction control compound from the reservoir to the opening when the temperature data of the first motor is above a predetermined non-zero threshold.

19. The system of claim 18, wherein the delivery system includes a junction switch configured to direct the traction control compound to a first pipe arm or a second pipe arm based on a forward motion of a vehicle system.

20. The system of claim 17, wherein the traction control compound is sand or sandite.

* * * * *